United States Patent
Avula et al.

(10) Patent No.: US 11,122,468 B2
(45) Date of Patent: Sep. 14, 2021

(54) METHOD AND SYSTEM FOR RAN-BASED TRAFFIC FLOW CONTROL

(71) Applicant: Verizon Patent and Licensing Inc., Arlington, VA (US)

(72) Inventors: Niranjan B. Avula, Frisco, TX (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 166 days.

(21) Appl. No.: 16/113,016

(22) Filed: Aug. 27, 2018

(65) Prior Publication Data
US 2020/0068439 A1 Feb. 27, 2020

(51) Int. Cl.
*H04W 28/10* (2009.01)
*H04L 29/08* (2006.01)
*H04W 84/04* (2009.01)

(52) U.S. Cl.
CPC ........... *H04W 28/10* (2013.01); *H04L 67/141* (2013.01); *H04W 84/042* (2013.01)

(58) Field of Classification Search
CPC ............................ H04W 28/10; H04L 67/141
See application file for complete search history.

(56) References Cited

U.S. PATENT DOCUMENTS

| | | | |
|---|---|---|---|
| 2007/0195764 A1* | 8/2007 | Liu ...................... | H04W 28/24 370/389 |
| 2012/0243460 A1* | 9/2012 | Muto ..................... | H04L 45/22 370/315 |
| 2017/0245241 A1* | 8/2017 | Yu ......................... | H04W 16/26 |
| 2018/0288784 A1* | 10/2018 | Stojanovski .......... | H04W 76/10 |
| 2018/0317121 A1* | 11/2018 | Liao ................. | H04W 28/0268 |
| 2019/0208456 A1* | 7/2019 | Mofidi .................... | H04W 4/80 |

* cited by examiner

*Primary Examiner* — Walter J Divito
*Assistant Examiner* — Anthony Luo

(57) ABSTRACT

A method, a device, and a non-transitory computer-readable storage medium are described in which a traffic flow control service is provided. The traffic flow control service provides that a wireless station of a wireless access network stores radio coverage information relating to communication links established with end devices. During various network procedures that establish or migrate a traffic flow session with an end device, the wireless station receives a profile from a policy control device. The profile includes radio coverage information and traffic flow parameters and values that correlate to the radio coverage information. The wireless station compares the stored radio coverage information with the radio coverage information in the profile, and selects the best match. The wireless station uses the traffic flow parameters and values to enforce a traffic flow relating to the end device.

20 Claims, 11 Drawing Sheets

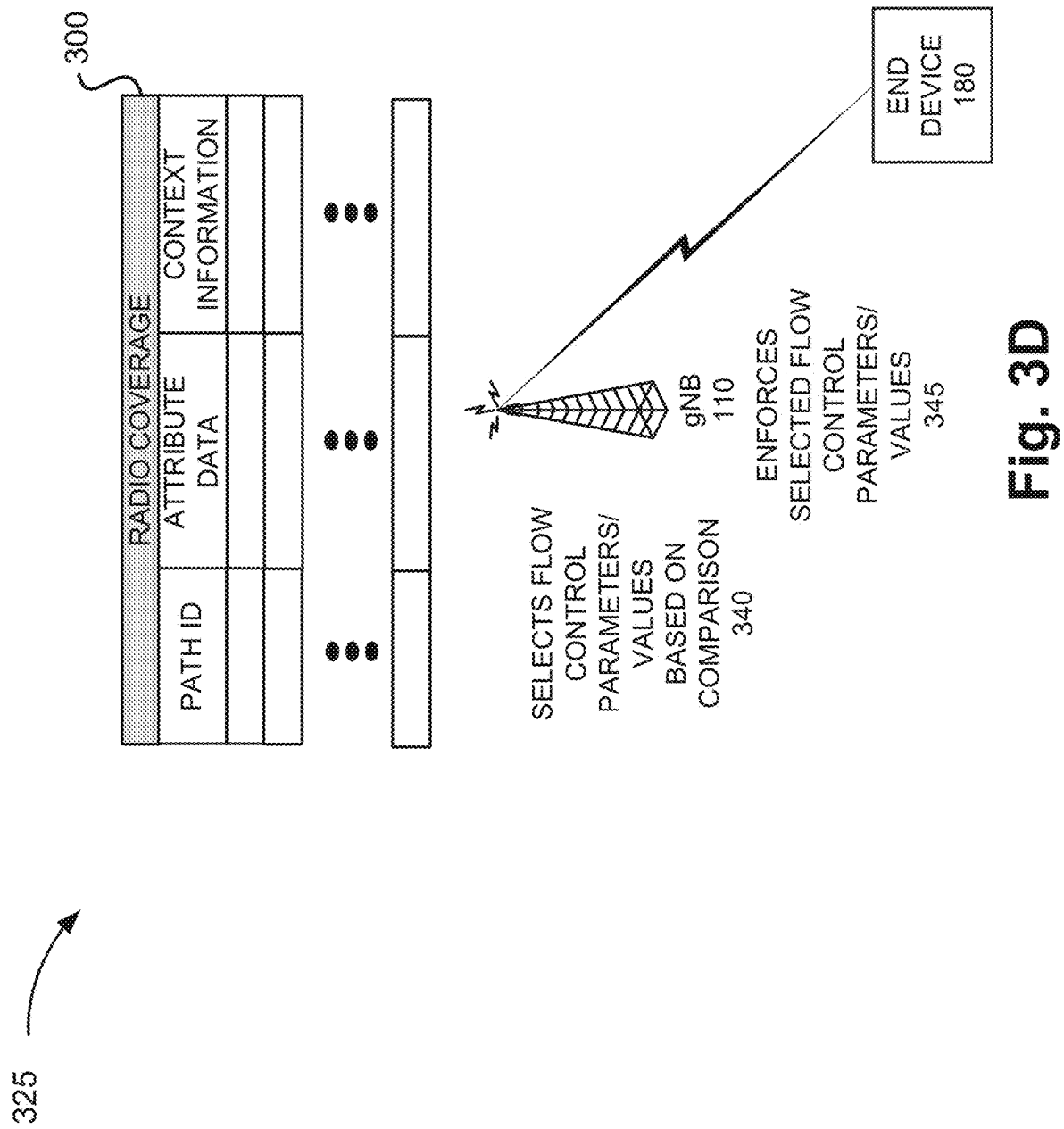

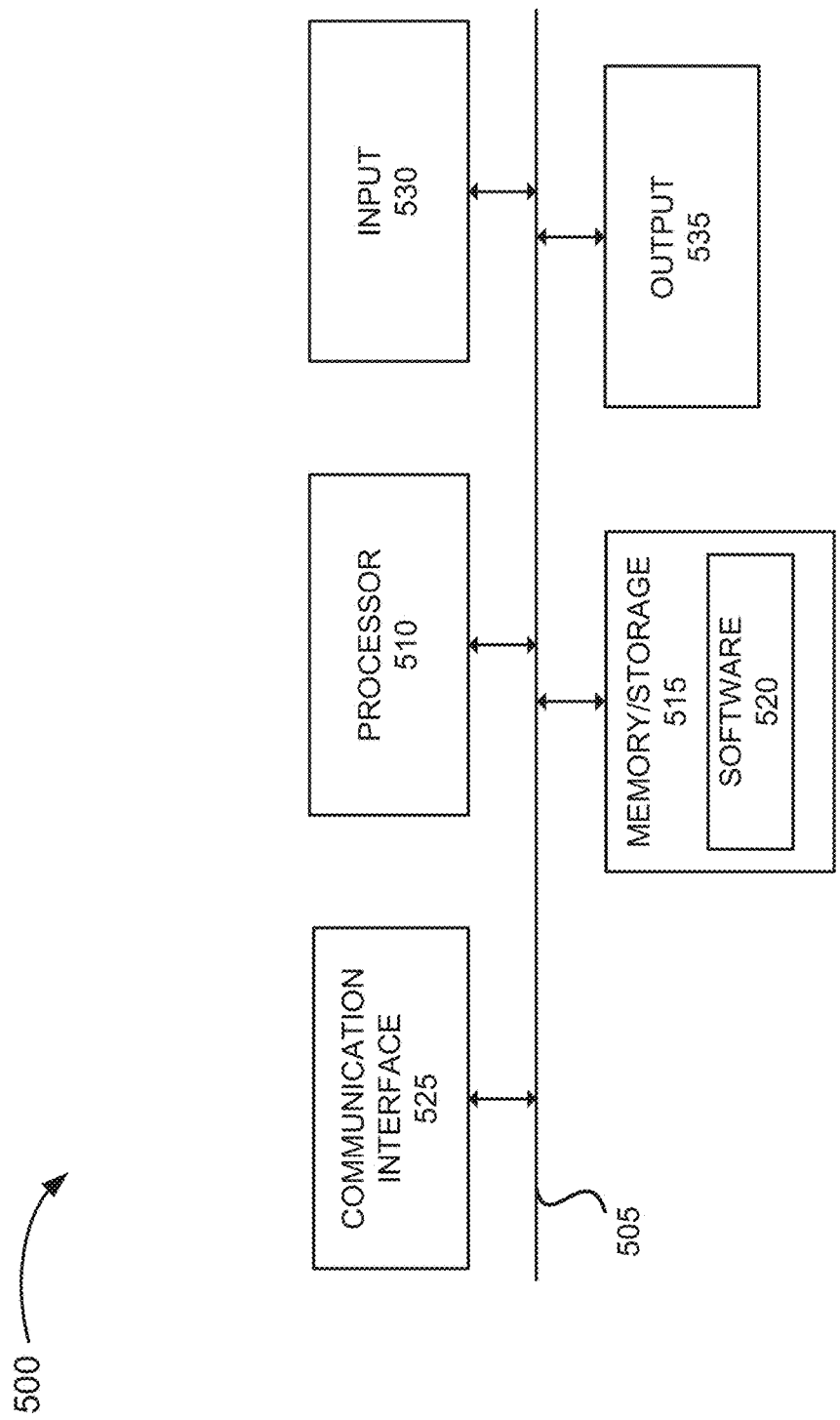

METHOD AND SYSTEM FOR RAN-BASED TRAFFIC FLOW CONTROL

BACKGROUND

Development and design of radio access networks (RANs) present certain challenges from a network-side perspective and an end device-side perspective. For example, depending on the configurations from both network-side and end device-side perspectives, such configurations may reduce the effective use of resources. Accordingly, a need exists to overcome these challenges.

BRIEF DESCRIPTION OF THE DRAWINGS

FIGS. 3C and 3D are diagrams illustrating an exemplary process of an exemplary embodiment of the traffic flow control service;

FIG. 5 is a diagram illustrating exemplary components of a device that may correspond to one or more of the devices illustrated and described herein.

DETAILED DESCRIPTION OF PREFERRED EMBODIMENTS

Figure 1:
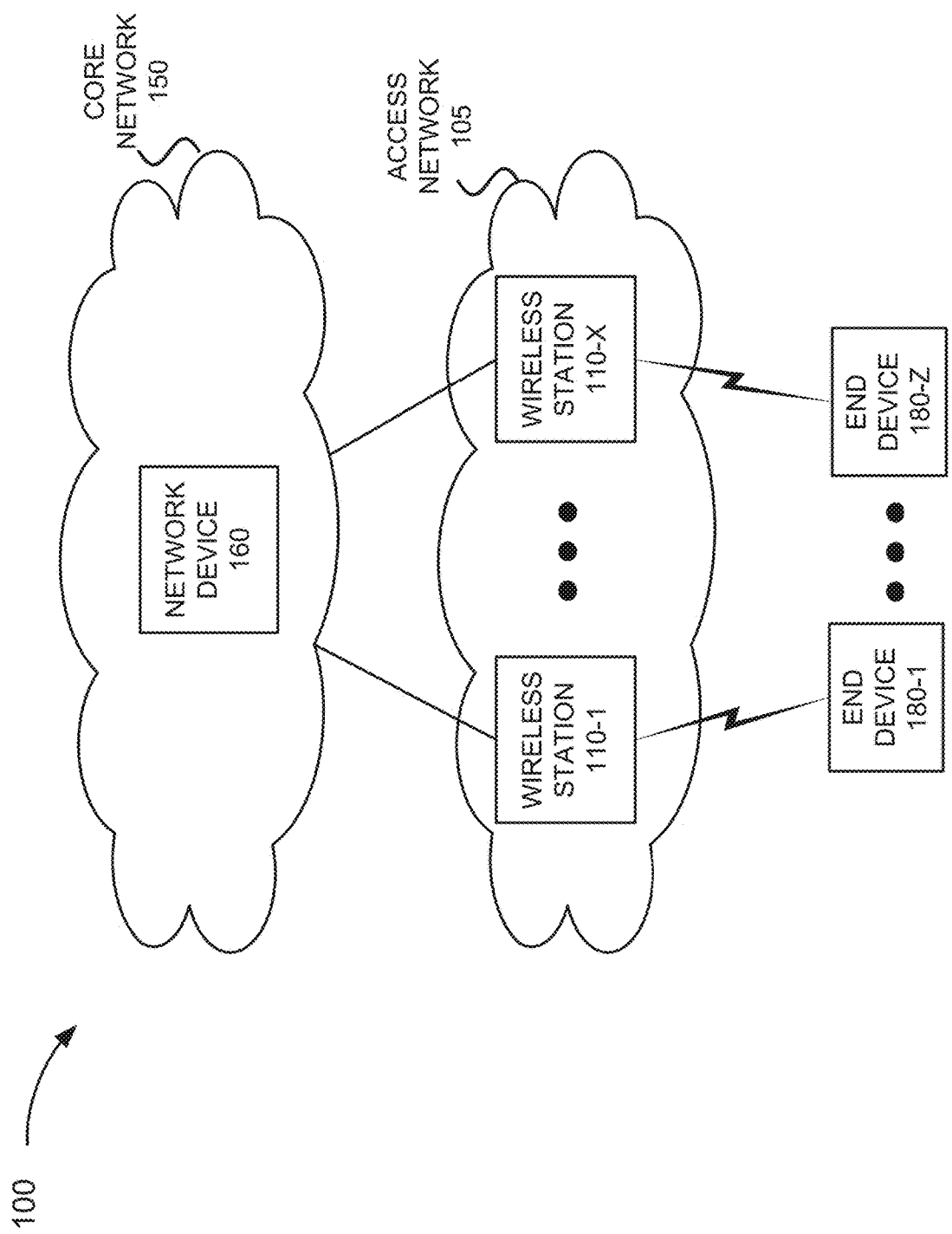
FIG. 1 is a diagram illustrating an exemplary environment in which an exemplary embodiment of a traffic flow control service may be implemented.

The following detailed description refers to the accompanying drawings. The same reference numbers in different drawings may identify the same or similar elements. Also, the following detailed description does not limit the invention.

A core network includes various network devices that manage various aspects of a wireless service, such as authentication and authorization, mobility management, bearer management, and so forth. For example, in Fourth Generation (4G) network, a 4.5G network, a Fifth Generation (5G) network, or other generation network, a network device, such as a policy control device may store and manage profiles that include control parameters and values relating to Quality of Service (QoS) flows or bearers. For example, the control parameters and values may indicate a Maximum Bit Rate (MBR), a Guaranteed Flow Bit Rate (GFBR), a Maximum Flow Bit Rate (MFBR), a Maximum Packet Loss Rate (MPLR), and/or other types of control parameters and values (e.g., packet error rate (PER), Allocation and Retention Priority (ARP), etc.).

During an attachment procedure or another type of network procedure (e.g., a Packet Data Unit (PDU) session establishment procedure, etc.) that includes the setting up of a QoS flow or a bearer (e.g., new, migration of (e.g., handover), etc.), the network device may select a QoS profile or another type of profile (e.g., a Traffic Flow Template (TFT), etc.) that governs the wireless service provided to an end device via the QoS flow or bearer. For example, the policy control device may select a profile that includes control parameters values that are applied to a flow or a bearer in the uplink and downlink directions. The policy control device may communicate the profile to other network devices of the core network (e.g., a Session Management Function (SMF), a User Plane Function (UPF), a Packet Data Network Gateway (PGW), a Gateway GPRS Support Node (GGSN), etc.) to enable enforcement of the profile.

Unfortunately, the selection and enforcement of the profile relative to the end device are performed without regard to the radio condition that exists in the RAN via which the end device is connected. For example, when the selection of the profile is made, the policy control device has no information pertaining to the radio connection between the RAN and the end device. As an example, the end device may connect to a wireless station (e.g., an evolved Node B (eNB), a next generation Node B (gNB), an evolved Long Term Evolution (eLTE) eNB, or another type of wireless node) of the RAN such that the radio connection may include various types of attributes. By way of further example, an attribute of the radio connection may include one or multiple frequency bands, one or multiple carriers, dual connectivity (DC) or higher, carrier aggregation (CA), use of a MegaHertz (MHz) frequency band, use of a GigaHertz (GHz) frequency band, use of single or multiple radio access technologies (RATs), etc.

In addition to attributes of the radio connection, the radio condition may include other types of information. For example, when the selection of the profile is made, the policy control device has no context information relating to the flow or bearer. For example, the deployment type of the wireless station (e.g., stadium, shopping mall, urban macro cell, etc.) is not known and considered. Further, decisions to use DC and CA are made by the wireless station in real-time and are not communicated to the core network.

As a result of the above-mentioned approach, given the absence of radio condition information available, the policy control device may select a profile that includes flow/bearer control parameters and values (e.g., Maximum Bit Rates (MBRs) for uplink/downlink (UL/DL), etc.) that are excessive relative to the actual radio condition associated with the end device in order to account for the possibility of such radio condition. As a consequence, the enforcement of the flow/bearer control parameters and values can lead to inefficient use of network resources. Conversely, the policy control device may select a profile that includes flow/bearer control parameters and values that are reductive relative to the actual radio condition associated with the end device in order to conserve network resources. As a consequence, the enforcement of the flow/bearer control parameters and values can lead to sub-optimal wireless service provisioned for the end device, and inefficient or overly constrained use of network resources that are available.

According to exemplary embodiments, a traffic flow control service is provided in which control parameters and values are selected by the RAN based on radio conditions/coverage relative to the end device. The control parameters and values regulate traffic (e.g., packets) in the uplink and/or the downlink directions associated with a flow (e.g., QoS flow) or a bearer. For purposes of description, the flow or the bearer is referred to herein as "flow" or "traffic flow."

According to an exemplary embodiment, a wireless station of the RAN provides the service. For example, the wireless station may be an eNB, a gNB, an eLTE eNB, a radio network controller (RNC), a small cell node (e.g., a picocell device, a femtocell device, a microcell device, a home eNB, etc.), or another type of wireless node (e.g., (e.g., a WiFi device, a WiMax device, a hot spot device, etc.) that provides a wireless access service to an end device.

According to an exemplary embodiment, the wireless station obtains flow control parameters and values that govern a flow between an end device and the wireless station, and the wireless station and a network device of the core network. According to an exemplary embodiment, the wireless station obtains the flow control parameters and values from a policy device of the core network. For example, the policy device may be a Policy Control Function (PCF), a Policy and Charging Rules Function (PCRF), a policy server, or another type of network device that stores and manages policies and/or rules that include flow control parameters and values, as described herein. According to an exemplary embodiment, the wireless station obtains the flow control parameters and values during an attachment procedure between the end device and the core network. According to other exemplary embodiments, the wireless station obtains the flow control parameters and values during another type of network procedure (e.g., a handover, a PDU session establishment procedure subsequent to attachment, etc.), as described herein.

According to exemplary embodiment, the wireless station selects and enforces the flow control parameters and values based on an attribute of the radio connection with the end device. As an example, the wireless station may select and enforce a different MBR for UL and DL relating to a non-Guaranteed Bit Rate (non-GBR) QoS flow depending on whether the radio connection is supported by a centimeter (cm) wavelength (e.g., below about 6 GigaHertz (GHz) frequency, 450 MegaHertz (MHz)-6 GHz, etc.) or a millimeter (mm) wavelength (e.g., above about 6 GHz; 24 GHz-53 GHz, etc.). According to other exemplary embodiments and examples, the wireless station selects and enforces other types of flow control parameters and values based on other types of radio coverages (e.g., other types of attributes of a radio connection, context information, etc.), as described herein.

As a result, the traffic flow control service may improve network resource utilization in a network. In contrast to other network devices (e.g., SMF, UPF, PGW, GGSN, etc.), which are unaware of radio conditions but enforce flow control parameters and values relative to a traffic flow between the RAN and the end device and a communication path between the wireless station and a network device of the core network (e.g., a serving gateway (SGW), a UPF, etc.), the wireless station may select and enforce flow control parameters and values based on the radio coverage associated with the traffic flow.

FIG. 1 is a diagram illustrating an exemplary environment 100 in which an exemplary embodiment of the traffic flow control service may be implemented. As illustrated, environment 100 includes an access network 105 and a core network 150. Access network 105 may include wireless stations 110-1 through 110-X (referred to collectively as wireless stations 110 and individually (or generally) as wireless station 110), and core network 150 may include a network device 160. Environment 100 further includes end devices 180-1 through 180-Z (referred to collectively as end devices 180 and individually (or generally) as end device 180).

The number, the type, and the arrangement of network devices, and the number of end devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc). A network device may be implemented according to various computing architectures, such as a centralized computing architecture, a distributed computing architecture, a cloud computing architecture (e.g., an elastic cloud, a private cloud, a public cloud, etc.), or a fog computing architecture.

Environment 100 includes communication links between the networks, between the network devices, and between the network devices and the networks. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 4G RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a future or next generation RAN (e.g., a 5G-access network (5G-AN) or a 5G-RAN (referred to herein as simply a 5G-RAN)), and/or other types of wireless networks, such as a WiFi network, a Worldwide Interoperability for Microwave Access (WiMAX) network, a local area network (LAN), a Bluetooth network, a personal area network (PAN), or another type of network that may be considered a network edge.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., RATs, etc.), wireless standards, and wireless frequencies/bands. For example, access network 105 may be a single RAT (e.g., 4G, 4.5G, 5G, etc.) or a multi-RAT (e.g., Evolved Universal Radio Access-New Radio (E-UTRA-NR) Dual Connectivity (EN-DC) environment, an NR-E-UTRA-DC (NE-DC) environment, a Next Generation (NG) radio access network (RAN) E-UTRA-NR DC (NGEN-DC) environment, etc.).

Access network 105 may be configured to support a DC service. For example, the DC service may include a secondary cell group (SCG) split bearer service, a master cell group (MCG) split bearer, an SCG bearer service, and so forth. Access network 105 may be configured to support a CA service, a network slicing service, or another type of connectivity service. Depending on the implementation, access network 105 may include one or multiple types of wireless stations 110. For example, wireless station 110 may be implemented as an eNB, a gNB, an eLTE eNB, an RNC, a small cell node (e.g., a picocell device, a femtocell device, a microcell device, a home eNB, etc.)), a macrocell node, a metrocell node, a non-cell node, or another type of wireless node (e.g., a WiFi device, a WiMax device, a hot spot device, etc.) that provides a wireless access service.

According to an exemplary embodiment, wireless station 110 includes logic that supports the traffic flow control service, as described herein. For example, wireless station 110 includes logic to receive a profile from a network device of core network 150. Wireless station 110 includes logic that stores the profile. According to an exemplary embodiment, the profile includes radio coverage information and a flow control parameter and value. For example, the radio coverage information may include an attribute of the radio connection and/or context information, as previously described. By way of further example, a first radio coverage may correlate to a first set of flow control parameters and values, while a second radio coverage may correlate to a second set of flow control parameters and values.

According to various exemplary embodiments, the profile includes a flow control parameter and value that pertains to the data plane (e.g., user plane), the control plane, or both. According to an exemplary embodiment, the profile includes a flow control parameter and value that pertains to a Non-GBR flow, a GBR flow, a delay critical GBR, or some combination thereof. According to an exemplary embodiment, the flow control parameter and value pertains to UL, DL, or both directions of the flow. According to an exemplary embodiment, the flow control parameter and value pertains to a communication path of the flow between end device 180 and wireless station 110, and a communication path between wireless station 110 and a network device of core network 150. For example, depending on the implementation of core network 150, the network device may be a UPF or an SGW (e.g., on the data plane), or an MME or an AMF (e.g., on the control plane).

According to various exemplary embodiments, the flow control parameter and value may include a GFBR, a MFBR, a MPLR, a PER, an ARP, a MBR, a QoS Class Identifier (QCI), an Access Point Name-Aggregate Maximum Bit Rate (APN-AMBR), a UE-AMBR, a Reflective QoS Attribute (RQA), a Packet Delay Budget, a priority level, and/or a Maximum Data Burst Volume (MDBV). According to other exemplary embodiments, the flow control parameter and value include another type of parameter and value that manages or restricts the communication of the flow on a communication plane (e.g., data, control, or another plane) in the network.

According to an exemplary embodiment, wireless station 110 includes logic that determines one or multiple attributes of the radio connection via which end device 180 communicates with access network 105 and/or context information. Based on the determination, wireless station 110 includes logic that attempts to match the radio coverage with the stored profile. For example, wireless station 110 may perform a lookup to determine whether the determined radio coverage matches a radio coverage included in the profile. In response to determining that a match exists, wireless station 110 enforces the correlated flow control parameter and value relative to the radio bearer between wireless station 110 and end device, and a communication path of a flow between wireless station 110 and a network device of core network 150. For example, the profile may include one or multiple control parameters and values in relation to the communication path between wireless station 110 and an SGW, or between wireless station 110 and a UPF. Wireless station 110 enforces the flow control parameters and values in the uplink and the downlink directions of the flow.

Core network 150 may include one or multiple networks of one or multiple network types and technologies. Core network 150 may include a complementary network of access network 105. For example, core network 150 may be implemented to include an Evolved Packet Core (EPC) of an LTE or an LTE-Advanced network, a next generation core (NGC) network, and/or a legacy core network. Depending on the implementation of core network 150, although not illustrated, core network 150 may include various network devices (illustrated as network device 160), such as for example, a mobility management entity (MME), a PGW, an SGW, a home subscriber server (HSS), an authentication, authorization, and accounting (AAA) server, a PCRF, a charging system (CS), a UPF, an access and mobility management function (AMF), an SMF, a unified data management (UDM) device, an authentication server function (AUSF), a network slice selection function (NSSF), a network repository function (NRF), a PCF, and so forth. According to other exemplary implementations, core network 150 may include additional, different, and/or fewer network devices than those described.

According to an exemplary embodiment, network devices of core network 150 include logic that supports the traffic flow control service, as described herein. According to an exemplary embodiment a policy control device stores and selects profiles that include flow control parameters and values, and distributes the profiles to network devices that provide flow enforcement. Depending on the implementation of core network 150, the policy control device may be implemented as a PCF, a PCRF, a policy server, or another type of network device that stores profiles. As described herein, according to an exemplary embodiment, the traffic flow control service includes flow enforcement provided by wireless station 110 based on the profile selected by the profile control device.

According to an exemplary embodiment, the policy control device selects a profile as a part of an attachment procedure with core network 150 (e.g., in which a PDU session or a bearer is established with end device 180), a bearer/flow establishment procedure (e.g., in which a bearer/flow is established with end device 180 subsequent to attachment to core network 150, etc.), subsequent to bearer/flow establishment (e.g., during an active session/traffic flow in which end device 180 is using the established bearer, etc.), or as a part of another type of network procedure and/or responsive to a network triggering event (e.g., an internetwork handover of end device 180, or other well-known procedures/triggers).

The policy control device may select the profile based on subscription information pertaining to end device 180/user of end device 180, the type of PDU session to be established, the type of traffic flow (e.g., virtual reality, video streaming, web browsing, etc.), and/or other network configuration information (e.g., policy rules (e.g., service-based policies, subscription-based policies, etc.), load level information in the network, a network slice, etc.)).

According to an exemplary embodiment, the policy control device transmits the flow control parameters and values to wireless station 110. For example, depending on the implementation of core network 150, the policy control device may transmit the profile to wireless station 110 via various network devices (e.g., PGW, SGW, MME, SMF, UPF, AMF, etc.). In this regard, these various network devices and communication interfaces (e.g., next generation (NG) interfaces (e.g., NG7, NG4, NG3, etc.), LTE interfaces (e.g., Gx, S5, S1-C, etc.)) are configured to support the traffic flow control service by way of the communication of the flow control parameters and values from the policy control device to wireless station 110. The flow control parameters and values may be communicated via the data plane, the control plane, and/or another plane of core network 150 and access network 105.

End device 180 includes a device that has computational and wireless communication capabilities. End device 180 may be implemented as a mobile device, a portable device, or a stationary device. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or other types of wireless user devices. End device 180 may be configured to execute various types of software (e.g., applications, programs, etc.). The number and the types of software may vary among end devices 180. End device 180 may support multiple RATs (e.g., 4G, 5G, etc.), multiple frequency bands, and so forth. Additionally, end device 180 may include one or multiple communication interfaces that provide one or multiple (e.g., simultaneous) connections via the same or different RATs, frequency bands, and so forth. The multimode capabilities of end device 180 may vary among end devices 180.

Figure 2A:
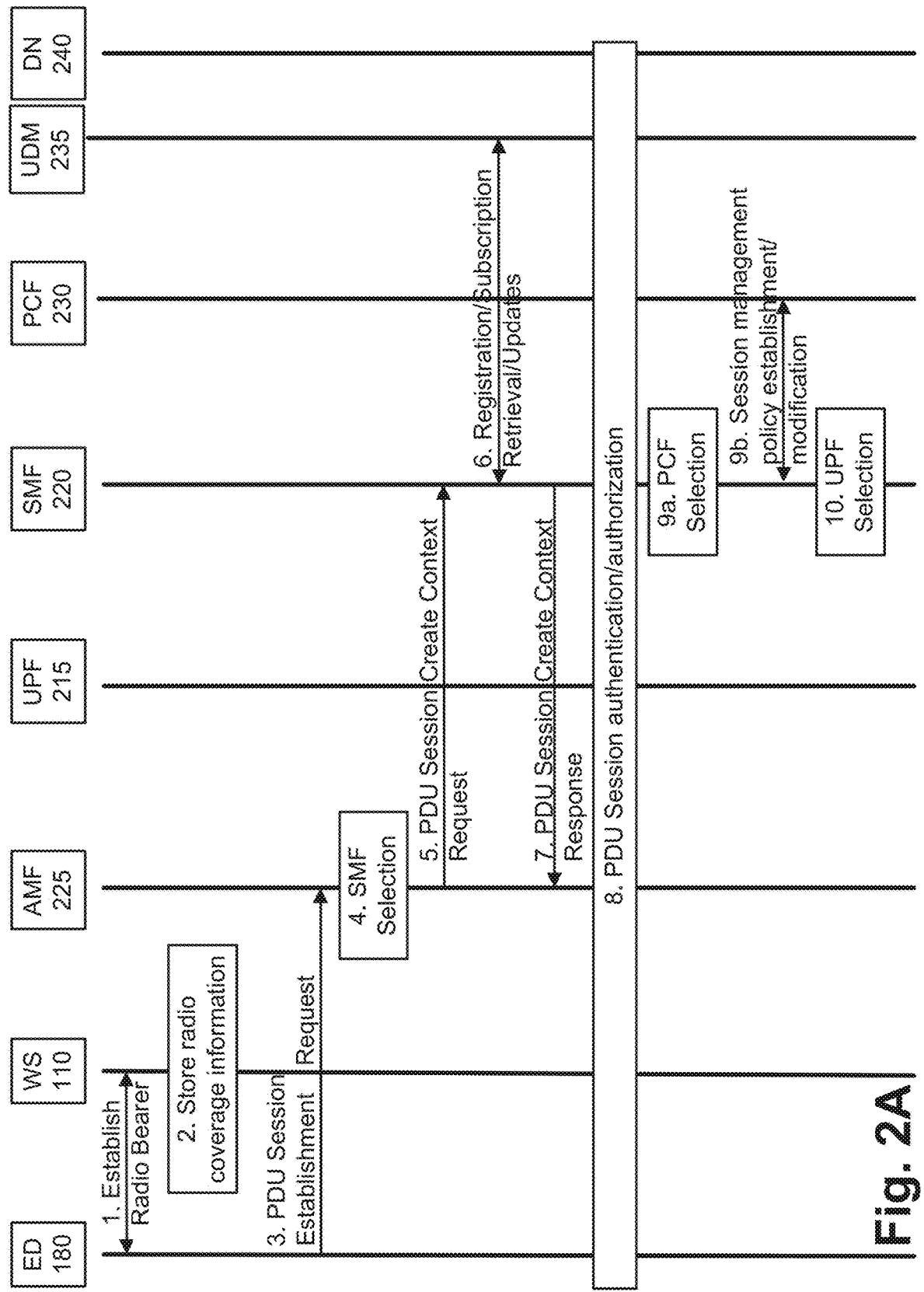
FIGS. 2A and 2B are diagrams illustrating an exemplary process of the traffic flow control service according to an exemplary scenario.
Figure 2B:
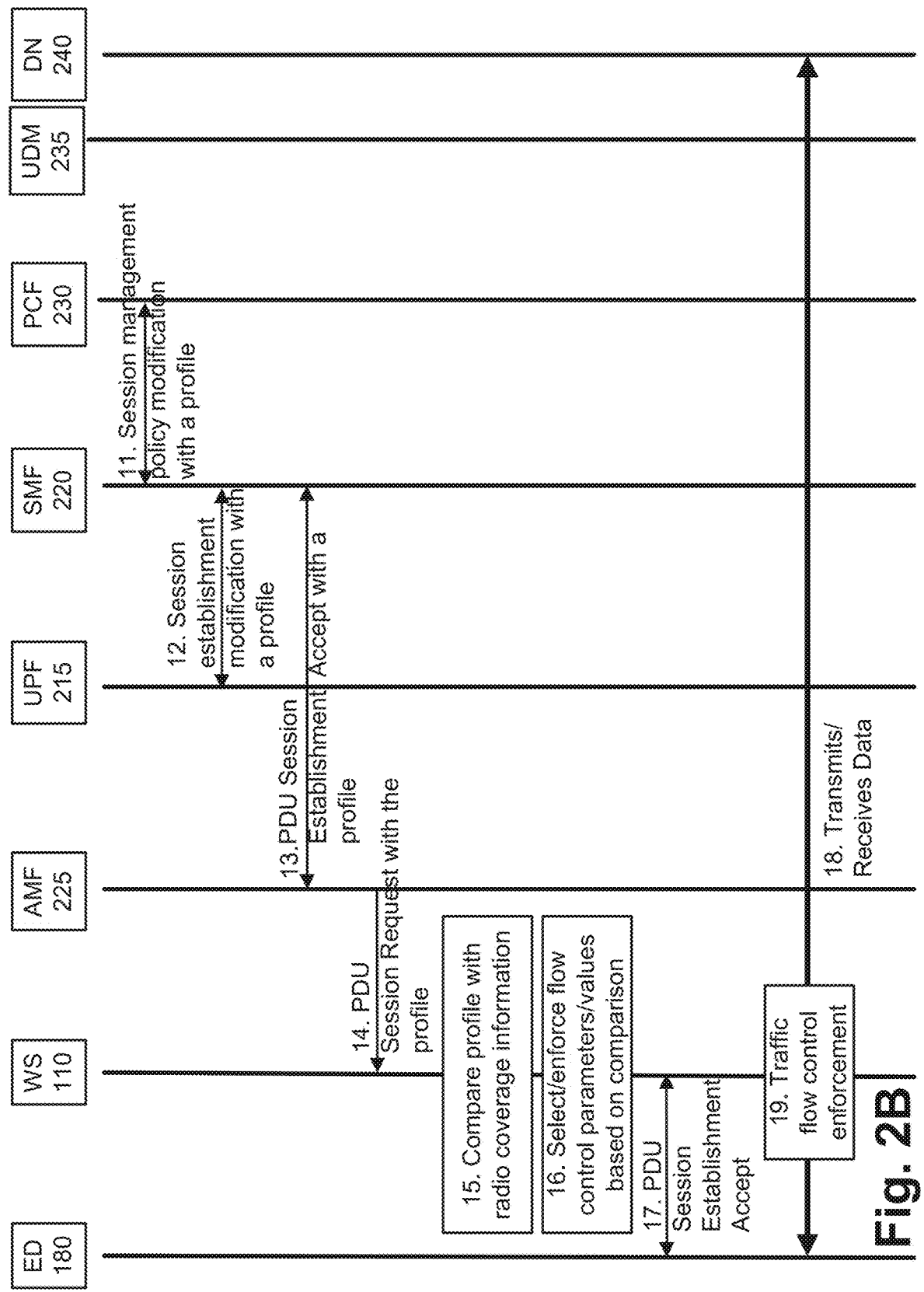

FIGS. 2A and 2B are diagrams illustrating exemplary processes of the traffic flow control service in relation to an exemplary PDU session establishment procedure. The messages explained and illustrated are exemplary and do not represent each and every message that may be exchanged during the procedure. According to this exemplary scenario, core network 150 is implemented to include a 5G core network. According to other exemplary embodiments, the traffic flow control service may involve different network devices of a different core network (e.g., 4G core network, etc.) and messages exchanged to establish a PDU session with associated flow control parameters/values.

Figure 3A:
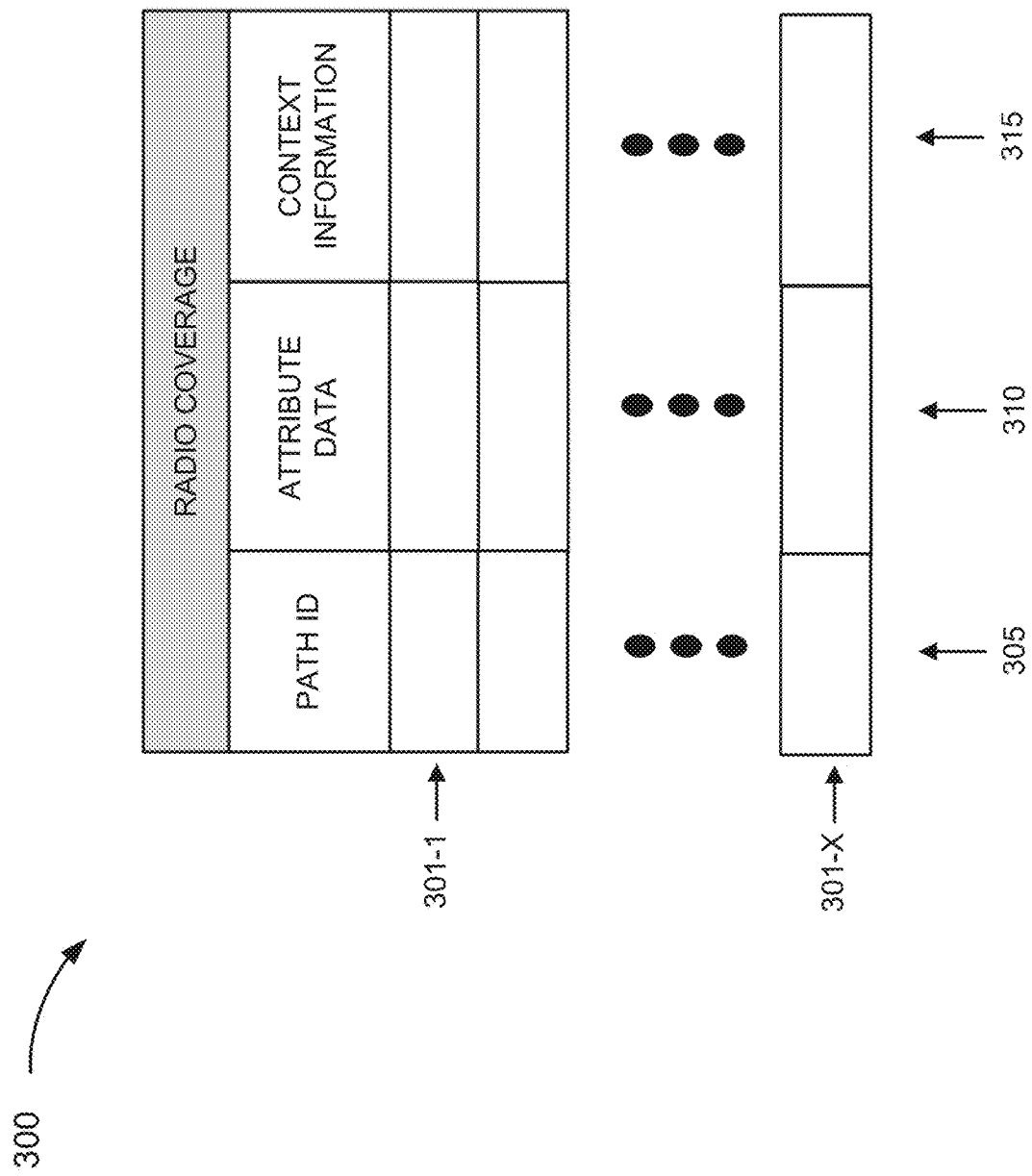
FIG. 3A is a diagram illustrating an exemplary data structure that stores exemplary radio coverage information.

Referring to FIG. 2A, in step (1), end device 180 and wireless station 110 establish a radio bearer. In step (2), wireless station 110 stores radio coverage information relating to the radio bearer. For example, FIG. 3A is a diagram illustrating exemplary radio coverage information that may be stored in a table 300. As illustrated, table 300 may include a path identifier (ID) field 305, an attribute data field 310, and a context information field 315. As further illustrated, table 300 includes records 301-1 through 301-X that each includes a grouping of fields 305, 310, and 315 that may be correlated. Radio coverage information is illustrated in tabular form merely for the sake of description. In this regard, radio coverage information may be implemented in a data structure different from a table.

Path ID field 305 may store data indicating an identifier of a communication link. For example, one or multiple identifiers may uniquely identify the uplink and the downlink relative to wireless station 110 and end device 180. Additionally, for example, path ID field 305 may store data indicating and identifier of a communication path and/or a communication link between wireless station 110 and an upstream network device of core network 150. For example, one or multiple identifiers may uniquely identify the uplink and downlink relative to wireless station 110 and an SGW, a UPF, or another type of network device.

Attribute data field 310 may store data indicating one or multiple attributes of a communication link. For example, the attribute may indicate the number of frequency bands, the frequency band, the number of carrier frequencies, and/or the carrier frequency. Additionally, or alternatively, the attribute may indicate whether DC or higher service (e.g., tertiary or higher connectivity) or CA service is provided to end device 180. Additionally, or alternatively, the attribute may indicate the number of RATs and/or the RAT (e.g., LTE, LTA-A, NR, etc.) used by end device 180. Similar to path ID field 305, the data stored in attribute data field 310 may relate to a communication link between wireless station 110 and end device 180. Alternatively, the data may relate to both the communication link between wireless station 110 and end device 180, and a communication link between wireless station 110 and an upstream network device of core network 150.

Context information field 315 may store data other than an attribute of the communication link that relates to end device 180 and/or wireless station 110. For example, context information field 315 may indicate the deployment type of the wireless station 110 (e.g., stadium, shopping mall, etc.), the type of end device 180 (e.g., IoT, smartphone, etc.), whether the radio communication link is indoors or outdoors, whether the communication link is third party sponsored or not, whether the communication link stems from a hotspot or not, and/or other types of context information. The context information may relate to one or multiple communication links, as described herein.

According to other exemplary implementations, table 300 may store additional, fewer, and/or different instances of radio coverage information in support of the traffic flow control service, as described herein. For example, table 300 may include an end device identifier and/or a user identifier field. The identifier field may store a unique identifier that identifies end device 180 and/or a user associated with end device 180. By way of example, the identifier field may store an International Mobile Subscriber Identity (IMSI), a Globally Unique Temporary Identifier (GUTI), an International Mobile Station Equipment Identity (IMEI), a Mobile Equipment Identifier (MEID), a Media Access Control (MAC) address, an Internet Protocol (IP) address, or another type of (unique) identifier of end device 180 or a user of end device 180. According to other examples, table 3000 may not include context information field 315 or context information field 315 may correlate only to a communication link between wireless station 110 and end device 180, and not with a communication link between wireless station 110 and an upstream network device of core network 150.

Referring to back to FIG. 2A, in step (3) end device 180 transmits a PDU Session Establishment Request, which initiates a PDU Session Establishment procedure, to an AMF 225 via wireless station 110. In response to receiving the PDU Session Establishment Request, in step (4), AMF 225 performs an SMF selection procedure. Subsequent to selecting the SMF (e.g., SMF 220), in step (5), AMF 225 transmits a PDU Session Create Context Request to SMF 220 (e.g., to establish an association with SMF 220 for a PDU Session).

In step (6), SMF 220 communicates with a UDM 235 to obtain registration and subscription information. In step (7), SMF 220 transmits a PDU Session Create Context Response to AMF 225, which may include a session management (SM) Context Identifier. In step (8), a PDU Session Authentication/Authorization procedure is performed pertaining to end device 180.

In steps (9a) and (9b), a PCF (e.g., PCF 230) is selected and a Session Management Policy Establishment/Modification procedure between SMF 220 and PCF 230 is performed. In step (10), SMF 220 selects a UPF (e.g., UPF 215) to support the requested PDU session. Referring to FIG. 2B, in step (11), based on the selection of UPF 215, SMF 220 and PCF 230 may perform a Session management policy modification procedure, which may include PCF 230 providing SMF 220 a profile relating to the PDU session/flow being set up.

In step (12), SMF 220 and UPF 215 perform a Session establishment modification procedure. As illustrated, the procedure includes SMF 220 providing UPF 215 with a profile relating to the PDU session/flow. According to an exemplary implementation, UPF 215 may use the profile to enforce only a traffic flow between UPF 215 and an upstream network device (e.g., a destination node 240). According to another exemplary implementation, UPF 215 may use the profile to enforce one or multiple attributes of a traffic flow between wireless station 110 and UPF 215, and the traffic flow between UPF 215 and the upstream network device. According to such an exemplary implementation, wireless station 110 may enforce a remainder portion of the attributes of the traffic flow between wireless station 110 and UPF 215 based on a profile obtained from PCF 230 and the traffic flow control service, as described herein.

In step (13), SMF 220 and AMF 225 perform a PDU Session Establishment Accept procedure that includes the transmitting of a profile to be forwarded to wireless station 110 in support of the traffic flow control service, as described herein. In step (14), in response to receiving the message that includes the PDU Session Establishment Accept and profile, AMF 225 transmits a PDU Session Request that includes the profile. For example, AMF 225 may transmit the PDU Session Request, which includes the profile, as a Non-Access Stratum (NAS) message.

Figure 3B:
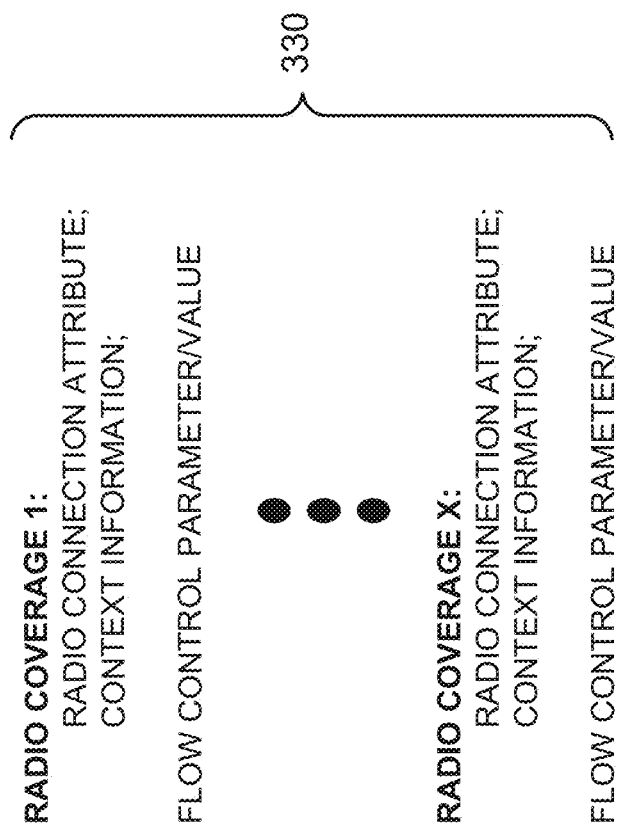
FIG. 3B is a diagram illustrating an exemplary profile.

In step (15), in response to receiving the profile, wireless station 110 compares the profile with the stored radio coverage information. According to an exemplary implementation, the profile includes multiple radio coverages in which each radio coverage includes correlated data. For example, referring to FIG. 3B, a profile 330 may include radio coverages 1 through X, in which X>1. The radio coverage may relate to information that is unavailable to core network 150, such as the various communication link attributes and context information, as described herein. The flow control parameter and value correlates to the radio coverage.

According to other examples, profile 330 may include additional, different, and/or fewer instances of data. For example, the profile may include identifier information (e.g., a PDU session ID, a communication link identifier, etc.). In this way, the profile may include one or multiple flow control parameters and values for one or multiple communication links (e.g., between wireless station 110 and end device 180, wireless station 110 and UPF 215, etc.). According to other examples, the profile may not include context information, or include context information for only radio communication links (e.g., between wireless station 110 and end device 180).

Figure 3C:
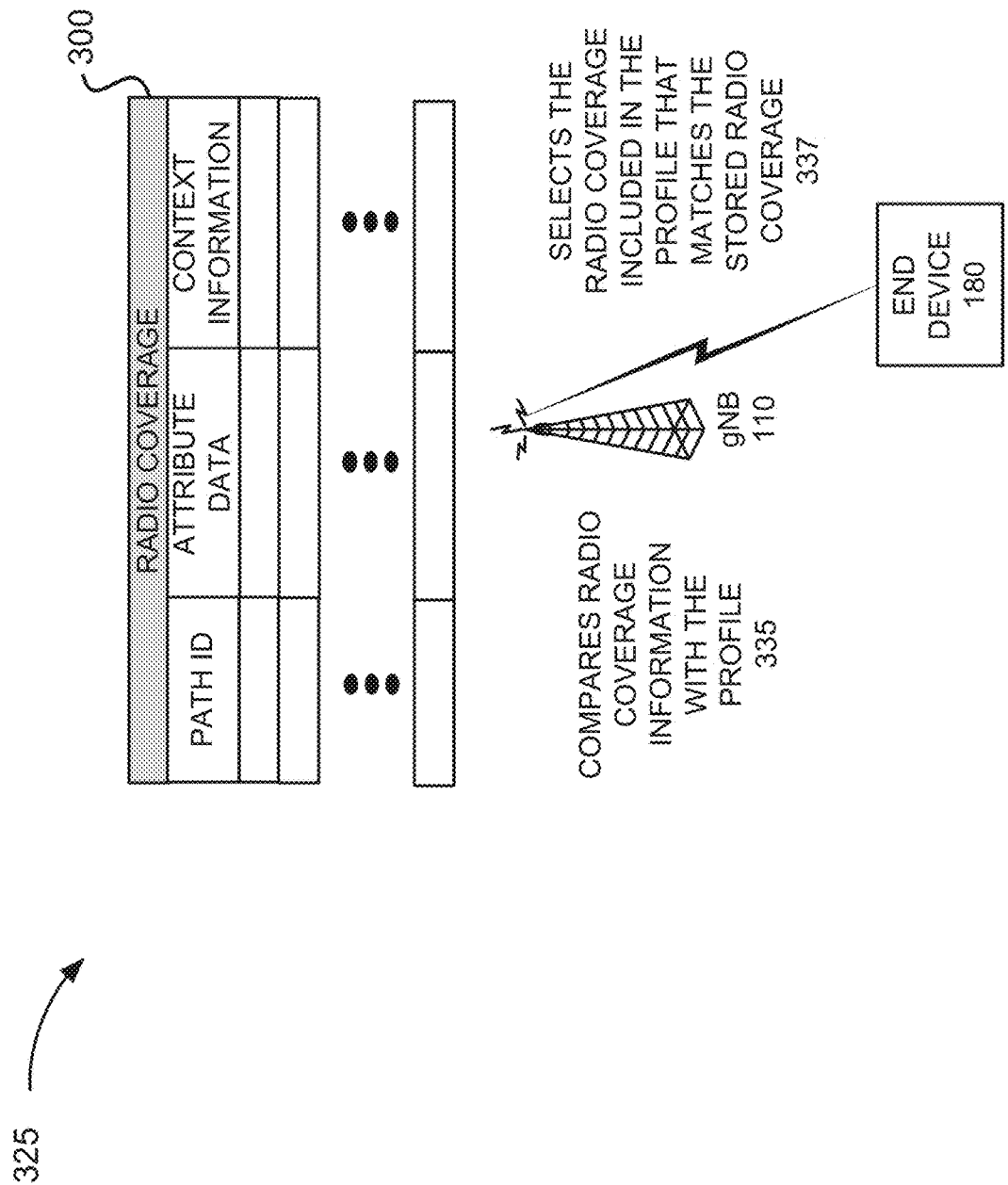

Referring to FIG. 3C, according to an exemplary process 325, wireless station 110 (e.g., gNB 110) compares the stored radio coverage information to the profile 335. Wireless station 110 selects the radio coverage included in the profile that matches (or best matches) the stored radio coverage 337. Referring to FIG. 3D, wireless station 110 selects the flow control parameter/value included in the profile based on the result of the comparison 340. Wireless station 110 will enforce the selected flow control parameters/values 345 in relation to the traffic flow of a communication link. Referring back to FIG. 2B, the selection and enforcement is illustrated in step (16).

In step (17), wireless station 110 and end device 180 perform a PDU Session Establishment Accept procedure. For example, according to some exemplary scenarios, an RRC Connection Reconfiguration procedure may take place so as to establish RAN resources in support of the flow control parameters/values to be enforced in accordance with the obtained profile and the selected radio coverage. According to other exemplary scenarios, wireless station 110 may set up and/or apply the selected flow control parameters/values to a DC service, a CA service, or another communication link configuration. Wireless station 110 may update the radio coverage information (e.g., in table 300) in correspondence to modifications relating to the communication link(s) used in support of the PDU session.

In step (18), end device 180 transmits data to and/or receives data from a destination node 240. For example, destination node 240 may be a network device of the Internet or another type of network that provides an asset or an end device service (e.g., video streaming, etc.). In step (19), wireless station 110 provides traffic flow control enforcement in relation to the transmission and/or reception of data. For example, wireless station 110 uses the flow control parameters and values to enforce the traffic flow on the data plane between end device 180 and wireless station 110. Alternatively, for example, wireless station 110 uses the flow control parameters and values (from step (16)) to enforce the traffic flow on the data plane between end device 180 and wireless station 110, and between wireless station 110 and UPF 215. According to other exemplary scenarios, different communication links and/or planes of communication may be enforced by wireless station 110 and/or cooperatively with another network device (e.g., UPF, SGW, etc.), as previously described.

While FIGS. 2A and 2B illustrate exemplary messaging and describe exemplary processes of the traffic flow control service, according to other embodiments, wireless station 110 of access network 105, and/or network devices of core network 150 may perform additional, different, and/or fewer steps or processes in support of the traffic flow control service. For example, when the PDU Session Establishment Request pertains to an existing PDU session (e.g., versus a new PDU session), or relates to an emergency service, some of the messaging and processes may be different. However, despite these differences, the PDU Session Establishment may include traffic flow enforcement, by wireless station 110, based on the radio coverages, as described herein.

Figure 4A:
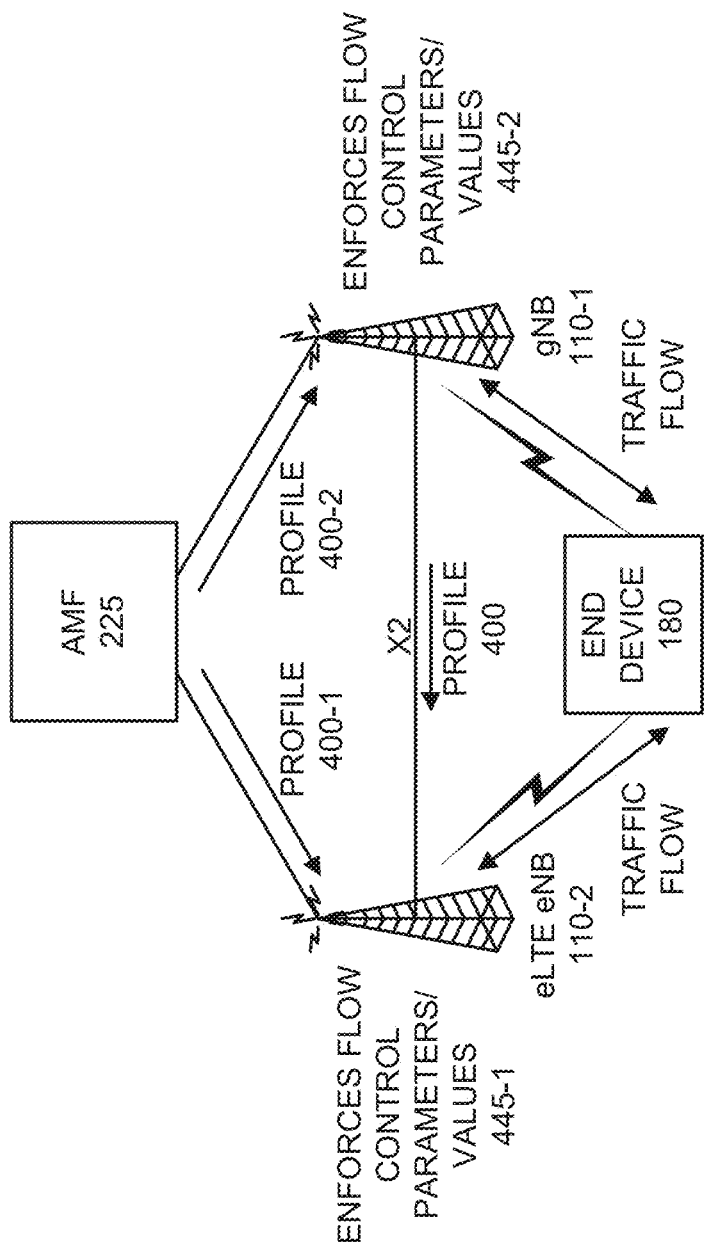
FIGS. 4A-4C are diagram illustrating other exemplary processes of an exemplary embodiment of the traffic flow control service.

FIG. 4A is a diagram illustrating another exemplary process of the traffic flow control service. According to this exemplary scenario, assume that end device 180 is provided a DC service from wireless stations 110 (e.g., a gNB 110-1 and an eLTE eNB 110-2). According to an exemplary implementation, in relation to step (14) of FIG. 2B, AMF 225 may provide a profile (e.g., profile 400-1 and profile 400-2) to each wireless station 110. Alternatively, although not illustrated, AMF 225 may provide the profile to a master node (e.g., gNB 110-1), and the master node may provide the profile to a secondary node (e.g., eLTE eNB 110-2) via an X2 interface or another suitable interface. According to either exemplary scenario, wireless stations 110 may enforce the flow control parameters and values 445-1 and 445-2 in the uplink and downlink directions in relation to the traffic flows.

Figure 4C:
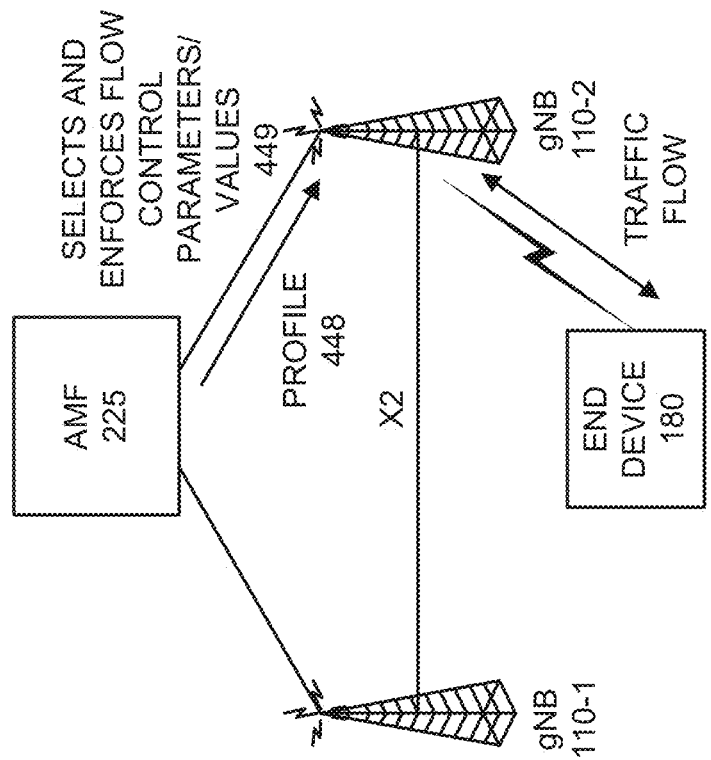
Figure 4B:
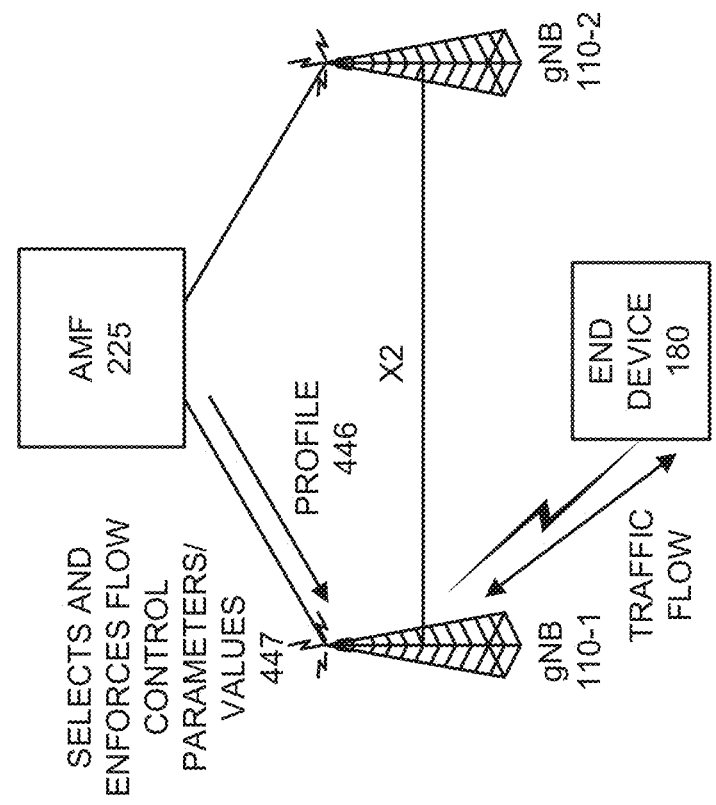

FIGS. 4B and 4C are diagrams illustrating yet another exemplary process of the traffic flow control service. According to this exemplary scenario, assume that a handover takes place in relation to end device 180. For example, as illustrated in FIG. 4B, gNB 110-1 may obtain a profile 446 from AMF 225, as a part of a PDU Session Establishment procedure. gNB 110-1 may select and enforce the flow control parameters values 447 in accordance traffic flow control service, as described herein. Subsequently, referring to FIG. 4C, end device 180 may be handed over to another wireless station (e.g., gNB 110-2). gNB 110-2 may obtain a profile 448, and selects and enforces flow control parameters/values 449 in relation to the traffic flow.

FIG. 5 is a diagram illustrating exemplary components of a device 500 that may be included in one or more of the devices described herein. For example, device 500 may correspond to components included in wireless station 110, network devices of core network 150 (e.g., an SGW, a PGW, UPF 215, SMF 220, AMF 225, PCF 230, UDM 235, an MME, or another type of network device of a core network, as described), end device 180, and destination node 240. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to a policy control device (e.g., PCF 230, a PCRF, a policy server, etc.), software 520 may include an application that, when executed by processor 510, provides a function of the traffic flow control service, as described herein. Additionally, with reference to wireless station 110, and other network devices (e.g., AMF, SMF, MME, SGW, PGW, etc.) of core network 150, which provide a communication path between the policy control device and wireless station 110, as described herein, software 520 may include an application that, when executed by processor 510, provides a function of the traffic flow control service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., centralized, distributed, etc.) and according to various network architectures (e.g., a virtualized function, a client device, etc.). Device 500 may be implemented in the same manner. For example, device 500 may be instantiated, spun up, spun down, etc., using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
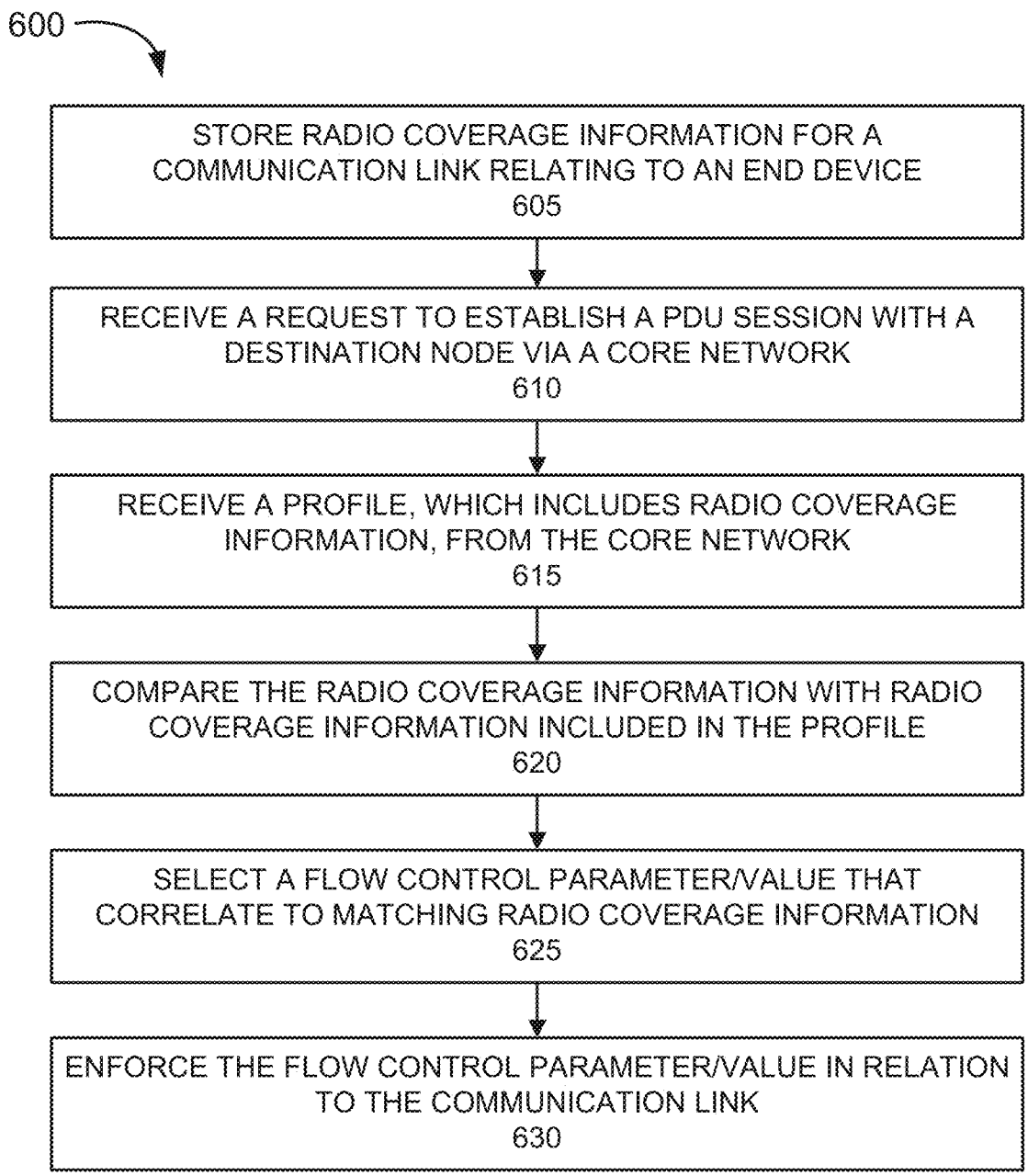
FIG. 6 is a flow diagram illustrating an exemplary process of an exemplary embodiment of the traffic flow control service.

FIG. 6 is a flow diagram illustrating an exemplary process 600 of an exemplary embodiment of the traffic flow control service. According to an exemplary embodiment, wireless station 110 may performs steps of process 600. For example, processor 510 executes software 520 to perform the step illustrated in FIG. 6, and described herein.

Referring to FIG. 6, in block 605, radio coverage information for a communication link relating to an end device is stored. For example, wireless station 110 stores an attribute of a communication link that is established between wireless station 110 and end device 180. According to other examples, the attribute may relate to a communication link that is established between wireless station 110 and an upstream network device of core network 150, or both, as previously described.

In block 610, a request to establish a PDU session with a destination node via a core network is received. For example, wireless station 110 may receive a request to establish a PDU session from end device 180.

In block 615, a profile, which includes radio coverage information, from the core network is received. For example, the radio coverage information may include an attribute of a communication link and/or context information, as described herein. The profile may include radio coverage information in relation to one or multiple communication links of which wireless station is an end point. For example, the communication link may be between wireless station 110 and end device 180 or between wireless station 110 and an upstream network device of core network 150 that is in a communication path that is to support the PDU session of end device 180.

In block 620, the radio coverage information included in the profile and the stored radio coverage information are compared. For example, wireless station 110 may perform a lookup and compare the radio coverage information pertaining to end device 180 with the radio coverage information included in the profile.

In block 625, a flow control parameter and value that correlates to the matching radio coverage information are selected. For example, wireless station 110 may select one or multiple flow control parameters and values that correlate to the matched (or best matched) radio coverage information.

In block 630, the flow control parameter and value in relation to the communication link is enforced. For example, wireless station 110 may enforce the flow control parameters and values in the uplink and/or the downlink directions in relation to the communication link.

Although FIG. 6 illustrates an exemplary process 600 of the traffic flow control service, according to other embodiments, process 600 may include additional operations, fewer operations, and/or different operations than those illustrated in FIG. 6, and described herein. For example, wireless station 110 may modify attributes of the communication link during a PDU Session Establishment Accept procedure with end device in view of the radio coverage indicated in the profile and the radio coverage selected. As previously described, wireless station 110 may set up a DC service, a CA service, or other communication links that were not established to receive the initial PDU Session request from end device 180. Wireless station 110 may also update the radio coverage information (e.g., in table 300).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    storing, by a radio access network (RAN) device of a RAN, first coverage information for a communication link established between the RAN device and an end device, wherein the first coverage information includes one or multiple first attributes of the communication link, and wherein the RAN device is a next generation Node B (gNB) or an evolved Node B (eNB);
    receiving, by the RAN device from the end device after the storing, a request to establish a packet data unit (PDU) session via the communication link;
    receiving, by the RAN device subsequent to receiving the request, a profile that includes multiple instances of second coverage information, wherein each instance of second coverage information correlates to one or multiple traffic flow control parameters and values;
    comparing, by the RAN device in response to receiving the profile, the multiple instances of the second coverage information to the first coverage information;
    selecting, by the RAN device in response to the comparing, one of the multiple instances of the second coverage information that matches the first coverage information; and
    enforcing, by the RAN device subsequent to an establishment of the PDU session, the one or multiple traffic flow control parameters and values, which correlate to the selected one of the multiple instances of the second coverage information, in relation to a traffic flow of the communication link.

2. The method of claim 1, wherein the one or multiple first attributes indicate one or multiple frequency bands, a radio access technology, and whether there is use of carrier aggregation or dual connectivity.

3. The method of claim 1, wherein the first coverage information includes context information pertaining to the communication link, wherein the context information indicates at least one of a deployment type of the RAN device, whether the communication link is indoors or outdoors, or whether the communication link is third party sponsored or not.

4. The method of claim 1, wherein the one or multiple traffic flow control parameters and values that correlate to the selected one of the multiple instances of the second coverage information include at least one of a Maximum Bit Rate (MBR), a Guaranteed Flow Bit Rate (GFBR), a Maximum Flow Bit Rate (MFBR), or a Maximum Packet Loss Rate (MPLR).

5. The method of claim 1, wherein the enforcing further comprises:
    enforcing, by the RAN device, the one or multiple traffic flow control parameters and values in relation to another communication link for the PDU session, wherein the other communication link is between the RAN device and an upstream network device of a core network, and wherein the upstream network device is one of a serving gateway (SGW) or a user plane function (UPF).

6. The method of claim 1, wherein the profile includes a Quality of Service (QoS) profile that includes one or multiple QoS parameters and values that relate to at least one of an uplink or a downlink for the traffic flow.

7. The method of claim 1, wherein the profile is received from a Policy Control Function (PCF) or a Policy and Charging Rules Function (PCRF).

8. The method of claim 1, wherein one or more values of the first coverage information differ from corresponding one or more values of the second coverage information.

9. A radio access network (RAN) device of a RAN comprising:
    a communication interface;
    a memory, wherein the memory stores instructions; and
    a processor, wherein the processor executes the instructions to:
        store first coverage information for a communication link established between the RAN device and an end device, wherein the first coverage information includes one or multiple first attributes of the communication link, and wherein the RAN device is a next generation Node B (gNB) or an evolved Node B (eNB);
        receive, via the communication interface from the end device after the storing, a request to establish a packet data unit (PDU) session via the communication link;
        receive, via the communication interface, a profile that includes multiple instances of second coverage information, wherein each instance of second coverage information correlates to one or multiple traffic flow control parameters and values;
        compare, in response to a receipt of the profile, the multiple instances of the second coverage information to the first coverage information;
        select, in response to the comparison, one of the multiple instances of the second coverage information that matches the first coverage information; and
        enforce, subsequent to an establishment of the PDU session, the one or multiple traffic flow control parameters and values, which correlate to the selected one of the multiple instances of the second coverage information, in relation to a traffic flow of the communication link.

10. The RAN device of claim 9, wherein the one or multiple first attributes indicate one or multiple frequency bands, a radio access technology, and whether there is use of carrier aggregation or dual connectivity.

11. The RAN device of claim 9, wherein the first coverage information includes context information pertaining to the communication link, wherein the context information indicates at least one of a deployment type of the RAN device, whether the communication link is indoors or outdoors, or whether the communication link is third party sponsored or not.

12. The RAN device of claim 9, wherein the one or multiple traffic flow control parameters and values that correlate to the selected one of the multiple instances of the second coverage information include at least one of a Maximum Bit Rate (MBR), a Guaranteed Flow Bit Rate (GFBR), a Maximum Flow Bit Rate (MFBR), or a Maximum Packet Loss Rate (MPLR).

13. The RAN device of claim 9, wherein when enforcing, the processor further executes the instructions to:
enforce the one or multiple traffic flow control parameters and values in relation to another communication link for the PDU session, wherein the other communication link is between the RAN device and an upstream network device of a core network, and wherein the upstream network device is one of a serving gateway (SGW) or a user plane function (UPF).

14. The RAN device of claim 9, wherein the profile includes a Quality of Service (QoS) profile that includes one or multiple QoS parameters and values that relate to at least one of an uplink or a downlink for the traffic flow.

15. The RAN device of claim 9, wherein one or more values of the first coverage information are differ from corresponding one or more values of the second coverage information.

16. The RAN device of claim 9, wherein the profile is received from a Policy Control Function (PCF) or a Policy and Charging Rules Function (PCRF).

17. A non-transitory computer-readable storage medium storing instructions executable by a processor of a radio access network (RAN) device that is a next generation Node B (gNB) or an evolved Node B (eNB) of a RAN, which when executed cause the RAN device to:
store first coverage information for a communication link established between the RAN device and an end device, wherein the first coverage information includes one or multiple first attributes of the communication link;
receive from the end device after the storing, a request to establish a packet data unit (PDU) session via the communication link;
receive a profile that includes multiple instances of second coverage information, wherein each instance of second coverage information correlates to one or multiple traffic flow control parameters and values;
compare, in response to a receipt of the profile, the multiple instances of the second coverage information to the first coverage information;
select, in response to the comparison, one of the multiple instances of the second coverage information that matches the first coverage information; and
enforce, subsequent to an establishment of the PDU session, the one or multiple traffic flow control parameters and values, which correlate to the selected one of the multiple instances of the second coverage information, in relation to a traffic flow of the communication link.

18. The non-transitory computer-readable storage medium of claim 17, wherein the one or multiple first attributes indicate one or multiple frequency bands, a radio access technology, and whether there is use of carrier aggregation or dual connectivity.

19. The non-transitory, computer-readable storage medium of claim 17, wherein the first coverage information includes context information pertaining to the communication link, wherein the context information indicates at least one of a deployment type of the RAN device, whether the communication link is indoors or outdoors, or whether the communication link is third party sponsored or not.

20. The non-transitory computer-readable storage medium of claim 17, wherein the one or multiple traffic flow control parameters and values that correlate to the selected one of the multiple instances of the second coverage information include at least one of a Maximum Bit Rate (MBR), a Guaranteed Flow Bit Rate (GFBR), a Maximum Flow Bit Rate (MFBR), or a Maximum Packet Loss Rate (MPLR).

* * * * *